B. BONNIKSEN.
SPEED INDICATOR AND THE LIKE.
APPLICATION FILED JAN. 15, 1913.
1,134,369.  Patented Apr. 6, 1915.
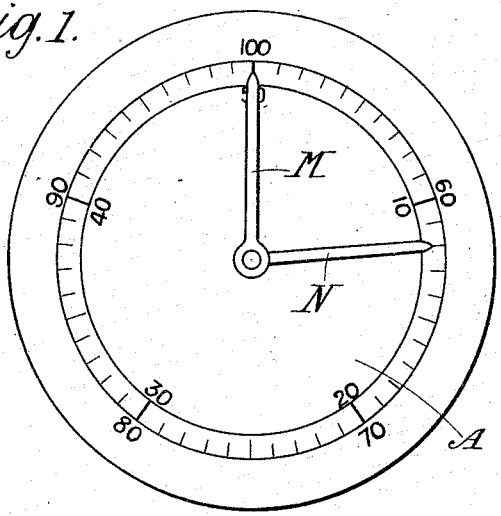
*Fig. 1.*
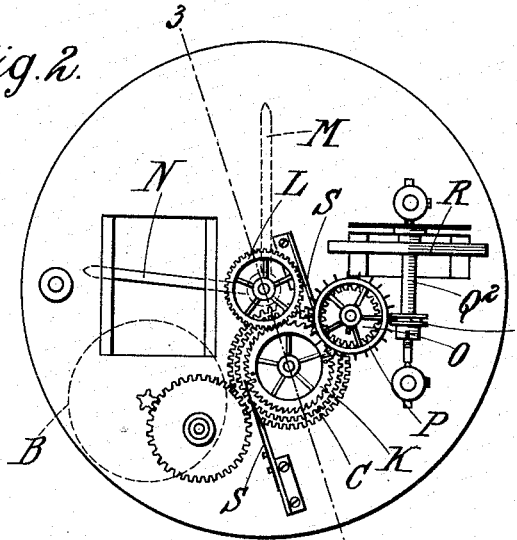
*Fig. 2.*
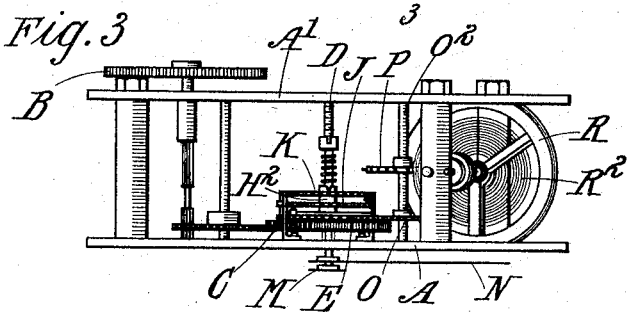
*Fig. 3.*
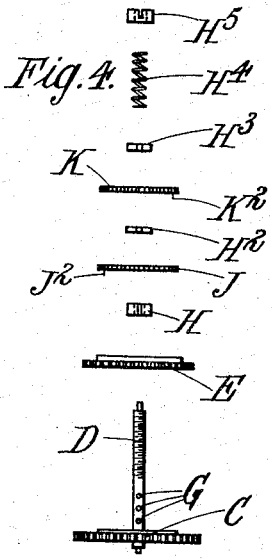
*Fig. 4.*
*Fig. 5.*
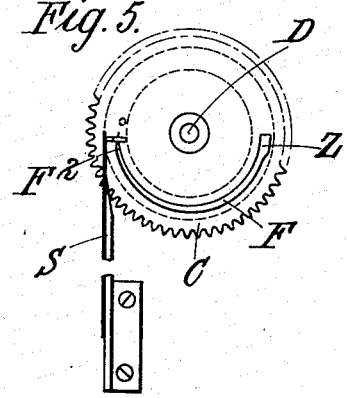
*Fig. 6.*
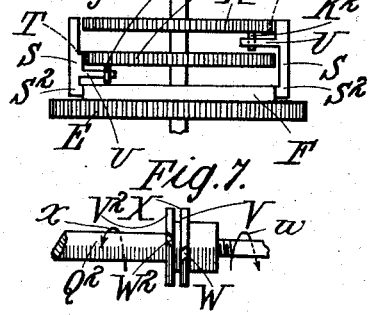
*Fig. 7.*
WITNESSES
INVENTOR
Bahne Bonniksen
PER
ATTORNEY

UNITED STATES PATENT OFFICE.

BAHNE BONNIKSEN, OF COVENTRY, ENGLAND.

SPEED-INDICATOR AND THE LIKE.

1,134,369. Specification of Letters Patent. Patented Apr. 6, 1915.

Application filed January 15, 1913. Serial No. 742,175.

*To all whom it may concern:*

Be it known that I, BAHNE BONNIKSEN, a subject of the King of Great Britain, and a resident of Coventry, in the county of Warwick, England, have invented certain new and useful Improvements in or Relating to Speed-Indicators and the like, of which the following is a specification.

This invention relates to speed indicators and the like such as are used on motor vehicles, and has reference to that type of speed indicator in which a pair of speed-indicating hands are alternately driven by the vehicle and arrested and returned to zero, the timing being effected by a clockwork escapement actuated by the vehicle.

In previous constructions of speed indicator of this type springs have been employed for returning the hands to the zero position. These springs are naturally unreliable, and the movement of the hands in opposite directions is disconcerting. In the present invention the hands always rotate or tend to rotate in the same direction, and no springs are required for returning the hands to zero. The hands can consequently be driven positively so that extreme accuracy is obtained. This is effected by gearing the hands to the road wheel or the equivalent and driving them frictionally under the control of an escapement also driven from the road wheel which introduces the time element to the movement of the hands and at the same time arrests these and allows them to proceed at the stated intervals.

In view of what has been said hereinabove, the chief object of the invention is to dispense with the use of springs as far as possible.

In the accompanying drawings, Figure 1 is a plan of a mileage speed indicator adapted to indicate up to 50 miles an hour. Higher speeds with the instrument constucted in accordance with this invention can be indicated, the hands in such cases passing beyond the zero position. Fig. 2 is a rear view of the mechanism with the back plate removed. Fig. 3 is an elevation looking in the direction of line 3—3 of Fig. 2. Fig. 4 is an elevation of the main driving spindle and the parts mounted thereon. Fig. 5 is a plan view of part of the mechanism. Fig. 6 is a diagrammatic side elevation of the same and Fig. 7 is an elevation of the escapement device, these three views being on a larger scale than the others.

Like letters indicate like parts throughout the drawings.

The frame of this device comprises two disks A A$^1$, above the former being a dial graduated in miles per hour. The two disks are suitably supported and provide bearings for the various spindles, etc. The wheel B is geared to the driving shaft, which in turn is geared to the road wheel, or the equivalent. In the majority of speed indicators the main spindle runs very much faster than the road wheel. In the present case the instrument and its driving shaft or flexible cable are geared down to less than the road wheel speed so that wear and tear on the operating shaft is very considerably reduced. The gear B through the gear train illustrated, drives the main driving wheel C which is fixed to a vertically arranged spindle D. Resting loosely on, and free to rotate in relation to the wheel C is what may be termed the release wheel E. This is provided with gear teeth and also with a cam ring F which is beveled radially at one end F$^2$, Fig. 5, and at the other end provided with a radial swell Z for a purpose to be afterward described.

The spindle D, see Fig. 4, is provided with three pegs G engaged by collars and the first collar H is provided with a keyway or slot engaging the lowest peg G. Thus the collar H must always rotate with the spindle but is free to slide thereon.

Resting on the collar H and free to rotate on the spindle is the first ratchet wheel J, which, as can be seen, is provided with a peg J$^2$ and also with ratchet teeth. Above the wheel J is arranged a collar H$^2$ also having a key slot engaging the central peg G. On this collar rests the free ratchet wheel K provided with ratchet teeth, and a peg K$^2$. Above these lies a collar H$^3$ engaging the upper peg G and acted on by a spring H$^4$ secured by a nut H$^5$ screwing on to the spindle D. The result of this construction is that the spring creates friction between the wheels and the collars so that all normally rotate with the main spindle D, but that either of the ratchet wheels J, K can be held stationary, and the release wheel E may travel at any speed slower than that of the wheel C. These ratchet wheels J and K engage by means of their ratchet teeth with gears (one of which is shown at L in Fig. 2 engaging the wheel K) on concentric vertical spindles. Each of these spindles carries one of the indicating hands M and N. Thus the hands normally rotate with the main spindle D but either can be arrested when the corresponding ratchet wheel J or K is stopped. When the ratchet wheel is released the hand will travel around, driven by the spindle D.

The spindle D it will be understood, is geared to the road wheel by gearing of known dimensions so that the distance the hand travels in relation to the movement of the road wheel is known, and no variable quantity, such as a resistance spring, is interposed.

The release wheel E meshes with an escapement pinion O fixed to a vertical spindle $O^2$ which carries an escapement pin wheel P. The pin wheel engages an escapement device Q, to be more fully described later, mounted upon a spindle $Q^2$ carrying a weighted balance wheel R. The spindle also has attached to it one end of an escapement spring or balance spring $R^2$, the other end of which is fixed.

As stated the release wheel E is pressed frictionally against the driving wheel C and tends to rotate at the same rate as the latter. It is however constrained by the escapement mechanism and can only rotate with a step by step motion at some pre-determined number of revolutions per minute. In the construction illustrated this wheel E is designed to rotate three times per minute, providing that the driving wheel C is being rotated at this or some higher speed, dependent upon the gear connection between the road wheel and the escapement and the speed of the vehicle. Preferably the connection is such that the instrument will indicate at such a low speed as five miles an hour.

Each ratchet wheel is engaged by a click S, which, as can be seen in Fig 2, are arranged diametrically opposite to each other. As can be seen, particularly in Fig. 6, the click is provided with a wide end having a part $S^2$ which engages the cam rim F and an enlarged pawl portion T which engages the ratchet teeth. The pawl portions T are at different heights in the two clicks to suit the positions of the ratchet wheels J K, see Fig. 6.

The clicks are also provided with fingers U which engage the pins $J^2$ and $K^2$. Thus the cam rim F can, when the click engages the part Z, Fig. 5, hold either click perfectly clear of the pin as well as the ratchet teeth on either wheel, or it can hold the click out of engagement with the ratchet teeth only leaving the finger U in engagement with the pin.

The pins of the escapement wheel P rest against the escapement device Q, which as can be seen in the enlarged view Fig. 7, comprises a pair of collars V $V^2$ suitably spaced and formed with reversed angular slots W $W^2$ which allow the pins on the escapement wheel to pass from one side of the collar into the space X.

In operation, directly the road wheel commences to revolve the driving spindle D will revolve endeavoring to rotate the friction driven ratchet wheels J K and the hands. If now one ratchet wheel is released for a known period, say one second, the corresponding hand will travel around the dial and stop at the end of this second. Therefore supposing that the vehicle is traveling slowly the hand will travel only a short way around the dial and stop at a low figure. If the vehicle is traveling fast the travel of the hand will be correspondingly large, and it will move through a greater angle before the period of release expires, and a higher rate of speed will be indicated on the dial.

The release and stoppage of the hand is effected by the escapement mechanism.

Assuming one hand, say N, to be registering 12 miles an hour, as shown in Fig. 1, and its ratchet wheel to be held in that position by the pawl part of its click S, the other hand M at zero will be held in that position by the finger U engaging with the pin $K^2$. Meanwhile the release wheel E is rotating the escapement pinion and the wheel P causing the pegs on the wheel P to press against the angular slot W. This pressure on the angular wall of the slot causes the balance spindle $Q^2$ to rotate slightly in one direction against the balance spring $R^2$, so as to allow the pin of the escapement wheel to enter the space X. The pin strikes and presses the collar $V^2$ and cannot pass farther until the spring $R^2$ reverses the balance wheel R bringing the angular slot $W^2$ opposite the pin. The pin passes through, pressing against the wall of the angular slot $W^2$, and imparting an impulse to the spindle which impulse is resisted by the spring causing the balance wheel and spindle to oscillate in the reverse direction allowing another pin to pass through the slot W, space X and $W^2$ as just described. Thus the release wheel E is allowed to move by a step by step movement owing to the escapement device described, and this escapement makes four vibrations in one second. I would state that when the peg on wheel P is pressing against the wall of slot W and causing the spindle $Q^2$ to rotate slightly in direction of arrow $w$, in Fig. 7, the spring $R^2$ is put under tension, and as soon as the peg enters space X, said spring will cause the spindle $Q^2$ to rotate in the reverse direction, $i$, $e$. in direction of arrow $x$, sufficiently to bring the slot $W^2$ opposite the peg in space X, which peg then immediately enters said slot $W^2$ and pressing against the wall of said slot to cause the spindle $Q^2$ to continue its rotation in the direction of arrow $x$, putting spring $R^2$ again under tension until the peg clears slot W², and as soon as it does, the spring rotates spindle Q² again in direction of arrow $w$, which brings slot W opposite the next succeeding peg to permit the latter to enter said slot W, and the operation described is repeated. Rotation of the release wheel E in due course thus brings the cam rim F around so as to release the click finger U from the pin K² which holds the hand M. This is effected by the swell Z, Fig. 5, and this swell is of short length allowing the hand M to be disengaged for one second only, in the construction illustrated. Directly the hand M is disengaged the end F² of the cam rim shifts the other click sufficiently far to free the other ratchet wheel J connected to the hand N. This hand is therefore free to travel around until it reaches the zero position, by which time the peg J² of its ratchet wheel will engage the other tongue U, causing the hand to stop at zero.

As stated, the hand M travels for a second and then stops at some point over the dial indicating the speed in miles an hour that the vehicle has traveled during that second. After a short interval the same sequence is repeated, the zero hand being allowed to travel to the speed recording position and the previously recording hand being freed and allowed to move on to zero. Thus at short intervals successive speed indications are made and there is always a stationary hand in an indicating or recording position. As the hands are directly geared to the road wheel errors are impossible providing correct intermediate gearing is used.

The object of employing two hands is to enable one to be always in the indicating position. One hand alone could be used, in which case it would move from zero to the indicating position and then proceed to zero and again move to indicate. In such cases it is clear that the hand would be moving the greater part of the time, whereas by using two hands one is always stationary.

As stated the dial of the indicator illustrated is graduated up to 50 miles an hour. There is however no limit to the speed which may be indicated as it is permissible for the indicating hand to pass beyond the zero position, making one or more complete revolutions, this indicating speeds higher than the maximum graduated on the dial. Thus the dial may be concentrically graduated as shown or otherwise marked so that readings can be easily made when the hand has passed the zero position. In the case of the instrument illustrated if 65 miles an hour were recorded the indicating hand during the second in which it is released would travel approximately one and a quarter times around and stop, and during the return movement to zero would travel the remaining three quarters of a revolution.

What I claim as my invention and desire to secure by Letters Patent of the United States is:—

1. In a speed indicator, the combination with a main driving spindle, of indicating hands, means for operating the hands alternately as described to cause each of them to partially rotate in a forward direction with the driving spindle comprising a driving wheel fast on the said spindle, a toothed wheel loose on the spindle and resting upon the said driving wheel, ratchet wheels also loose on the spindle, means for pressing the various wheels into frictional engagement with each other, concentric spindles carrying the hands, gear wheels on said spindles and gearing with the said ratchet wheels, an escapement mechanism operating directly upon the said ratchet wheels to temporarily arrest the rotation of the same, the hand spindles and hands when the latter are at an indicating position and to then release the said parts and cause the hands to continue their rotation in the forward direction until they reach their initial position.

2. In a speed indicator, the combination with a main driving spindle, of indicating hands, means for operating the hands alternately as described to cause each of them to partially rotate in a forward direction with the driving spindle comprising a driving wheel fast on said spindle, a toothed wheel loose on said spindle and resting upon the said driving wheel, a cam ring on said loose toothed wheel and beveled radially at one end and provided with a radial swell at the other end, ratchet wheels also loose on the spindle, means for pressing the various wheels into frictional engagement with each other, concentric spindles carrying the hands, gear wheels on said spindles and gearing with the said ratchet wheels, pawls engaging the said loose ratchet wheels and having fingers engaging pins on the said ratchet wheels, the said cam ring on the loose toothed wheel being adapted to operate upon the said pawls as set forth, and an escapement mechanism operating directly upon the said ratchet wheels to temporarily arrest the rotation of same, the hand spindles and hands when the latter are at an indicating position and to then release the said parts and cause the hands to continue their rotation in the forward direction until they reach their initial position.

3. In a speed indicator, the combination with a main driving spindle, of indicating hands, means for operating the hands alternately as described to cause each of them to partially rotate in a forward direction with the driving spindle comprising a driving wheel fast on said spindle, a toothed wheel loose on said spindle and resting upon the said driving wheel, a cam ring on said loose wheel and beveled radially at one end and provided with a radial swell at the other end, ratchet wheels also loose on the spindle and each provided with a pin, a spring arranged to normally press the various wheels into frictional engagement with each other, pawls provided with fingers adapted to engage the pins on the respective ratchet wheels, said pawls also having portions which engage the teeth of the said ratchet wheels and portions adapted to engage the cam ring as described, concentric spindles carrying the hands, gear wheels on said spindles and gearing with the said ratchet wheels, and an escapement mechanism operating directly upon the said ratchet wheels to temporarily arrest the rotation of same, the hand spindles and hands when the latter are at an indicating position and to then release the said parts and cause the hands to continue their rotation in the forward direction until they reach their initial position.

In testimony whereof I have signed my name to this specification in the presence of two subscribing witnesses.

B. BONNIKSEN.

Witnesses:
 ERIC. W. WALFORD,
 J. T. FAZAKARLEY.

Copies of this patent may be obtained for five cents each, by addressing the "Commissioner of Patents, Washington, D. C."